United States Patent [19]

Motomura et al.

[11] Patent Number: 4,469,206

[45] Date of Patent: Sep. 4, 1984

[54] HYDRAULICALLY-OPERATED FRICTIONAL ENGAGEMENT DEVICE

[75] Inventors: Jiro Motomura, Anjo; Kazuaki Watanabe, Toyota; Seiichi Nishikawa, Toyokawa, all of Japan

[73] Assignee: Aisin Warner Kabushiki Kaisha, Aichi, Japan

[21] Appl. No.: 346,211

[22] Filed: Feb. 5, 1982

[30] Foreign Application Priority Data

Feb. 21, 1981 [JP] Japan ................................ 56-24740

[51] Int. Cl.³ ............................................. F16D 69/00
[52] U.S. Cl. .................................... 192/3.28; 192/52; 192/70.14; 192/107 M
[58] Field of Search ...................... 192/3.28, 3.29, 3.3, 192/3.31, 52, 107 M, 70.14, 70.15, 70.21, 88 A

[56] References Cited

U.S. PATENT DOCUMENTS

| | | | |
|---|---|---|---|
| 2,175,418 | 10/1939 | Wales | 192/52 X |
| 3,239,037 | 3/1966 | Croswhite et al. | 192/3.3 |
| 4,167,993 | 9/1979 | Vukovich et al. | 192/3.3 |
| 4,274,519 | 6/1981 | Moroto et al. | 192/3.28 |
| 4,305,494 | 12/1981 | Ishida et al. | 192/107 M |
| 4,353,444 | 10/1982 | Bronaz | 192/3.28 X |
| 4,364,997 | 12/1982 | Yamamoto et al. | 192/107 M |
| 4,385,682 | 5/1983 | Yamamoto et al. | 192/107 M |

*Primary Examiner*—George H. Krizmanich
*Attorney, Agent, or Firm*—Koda and Androlia

[57] ABSTRACT

A fluid torque converter equipped with a direct-coupling clutch comprising a front cover fixed to the pump impeller of the fluid torque converter, and a clutch disk axially slidably mounted on the output shaft of the fluid torque converter and disposed between the front cover and the turbine runner.

A friction plate affixed to a friction surface formed on the front cover is divided into two portions, namely, a radially outer portion made of a frictional material having a large coefficient of dynamical friction and a large heat capacity and a radially inner portion made of a frictional material having a large coefficient of statical friction and a high compressive strength.

3 Claims, 5 Drawing Figures

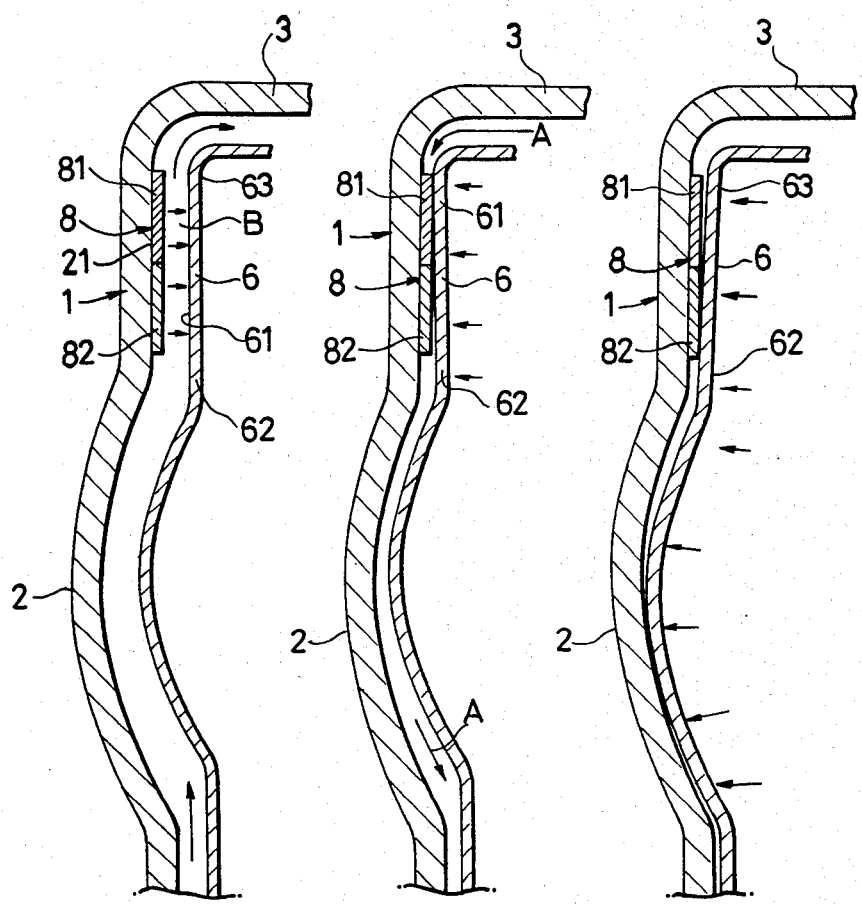

HYDRAULICALLY-OPERATED FRICTIONAL ENGAGEMENT DEVICE

BACKGROUND OF THE INVENTION

The present invention relates to a hydraulically-operated frictional engagement device formed between a first member and a second member which are adapted to be rotatable relatively to each other, more particularly to a direct-coupling clutch incorporated into a fluid torque converter.

A direct-coupling clutch is formed between the front cover of a fluid torque converter and the turbine runner or the output shaft of the fluid torque converter in order that the pump impeller of the fluid torque converter and the turbine runner or the output shaft of the fluid torque converter can be directly coupled. This direct-coupling clutch comprises an annular first friction surface formed on the inner surface of the front cover and a flat and annular friction surface formed on a clutch disk axially slidably mounted on the turbine runner or on the output shaft of the fluid torque converter and is adapted to engage the first and the second friction surfaces through a friction member made of a material of a large coefficient of friction by applying a fluid pressure to the back surface of the clutch disk.

It is known that the clutch disk is deformed slightly by the fluid pressure applied to the back surface of the clutch disk, since the clutch disk has a small thickness as compared with its large diameter. The deformation of the clutch disk results inevitably in the reduction in the effective frictional area.

Generally, it is desirable that the friction member has a large coefficient of dynamical friction to cope with considerable slip at the biginning of frictional engagement, a high heat resistance to avoid burning caused by the frictional heat generated during a transient period of engagement and a large heat capacity or a heat radiating property. On the other hand, after the frictional engagement has been completed, a large coefficient of statical friction and a high compressive strength (a strength to resist a great pressure working on the surface) are essential to provide a large capacity of torque transmission. Thus different characteristics are required of the friction member during the course of frictional engagement and after the completion of frictional engagement, therefore, a friction member made of a single material is incapable of meeting those different characteristics.

SUMMARY OF THE INVENTION

Generally speaking, the present invention provides a friction clutch comprising a first member having a flat and annular first friction surface, a disk-shaped second friction member relatively rotatable and axially movable with respect to the first member and having a flat and annular second friction surface, and an annular friction plate disposed between the first and the second friction surfaces and formed of a radially-outer portion and a radially-inner portion with respect to a circle of a predetermined radius each portion having a characteristic different from each other. One of the portions of the friction plate is made of a frictional material having a large coefficient of dynamical friction and a large heat capacity which are required during the course of frictional engagement and the other portion is made of a frictional material having a large coefficient of statical friction and a high compressive strength which are required after the completion of frictional engagement. The outer peripheral part of the second friction surface of the disk-shaped second member is protruding axially toward the first member relatively to the inner peripheral part thereof.

Accordingly, it is an object of the present invention to provide a highly reliable and highly durable friction clutch.

Another object of the present invention is to provide a friction clutch comprising a friction plate disposed between the respective friction surfaces of two frictionally engageable members and provided with both characteristics such as one required during the course of engagement of those two members and the other required after the completion of engagement of those two members.

Other object of the present invention is to provide a direct-coupling clutch incorporated into a fluid torque converter, which direct-coupling clutch comprising a friction plate disposed between the front cover of the fluid torque converter and the clutch disk and provided with both characteristics such as one required during the course of engagement of the clutch and the other required after the completion of the engagement of the clutch.

Still other objects and advantages of the present invention will in part be obvious and will in part be apparent from the specification.

BRIEF DESCRIPTION OF THE DRAWINGS

For a fuller understanding of the present invention, reference is had to the following description taken in connection with the accompanying drawings, in which;

FIGS. 2, 3 and 4 are enlarged partial sectional views of the direct-coupling clutch, respectively.

DESCRIPTION OF THE PREFERRED EMBODIMENTS

This invention will be described hereinafter referring to embodiments according to the present invention as applied to the direct-coupling clutch employed in a fluid torque converter.

Figure 1:
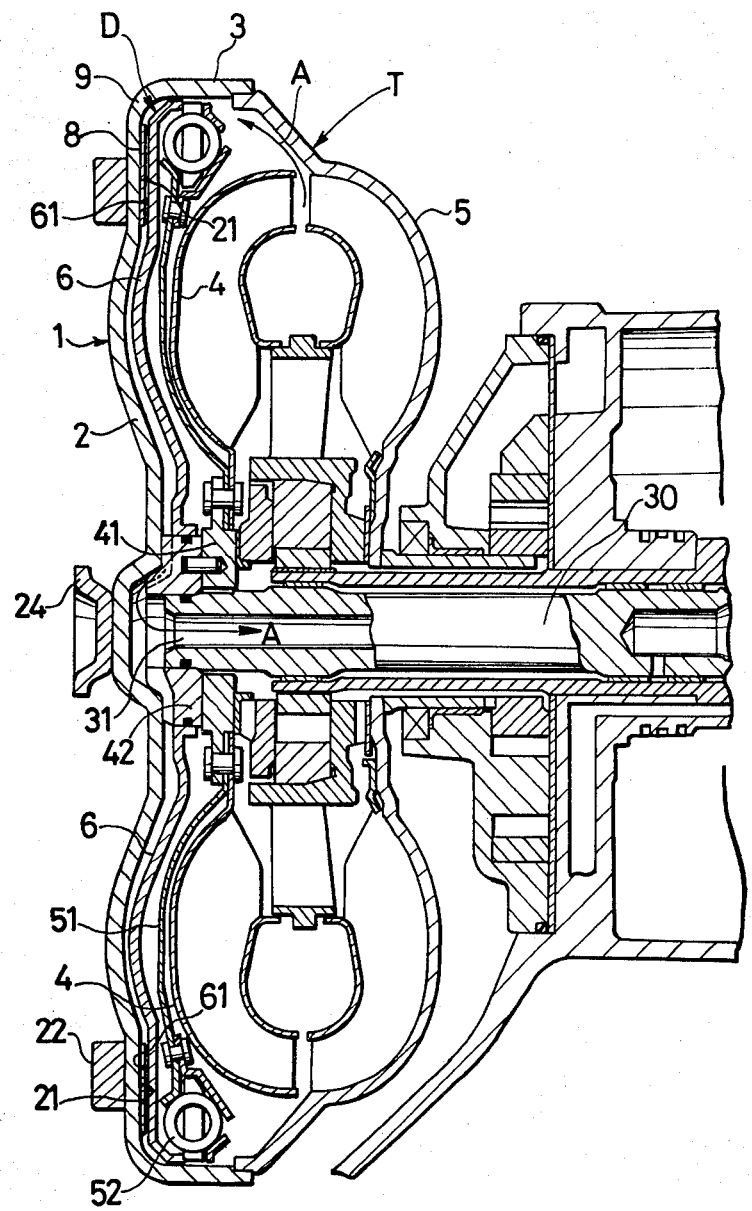
FIG. 1 is a sectional view of a fluid torque converter equipped with an embodiment of the direct-coupling clutch according to the present invention.

FIG. 1 is a sectional view of a torque converter comprising a direct-coupling clutch and adapted to be incorporated into a vehicle automatic transmission. A torque converter and the front cover of the torque converter are generally indicated at a symbol T and a reference numeral 1 respectively. The front cover 1 is formed in a configuration of a drum comprising a front wall portion 2 of a disk-shape, a cylindrical peripheral portion 3 which is extending from the periphery of the front wall portion 2 substantially perpendicularly to the front wall portion 2 and a curved connecting portion 9 connecting the front wall portion 2 and the peripheral portion 3. A center guide 24 is welded to the front wall portion 2 at the central axis thereof. A plurality of mounting seats 22 are welded to the front wall portion 2 at the marginal portion thereof. The torque converter 1 is connected coaxially to the output shaft, not shown, of an engine by means of the mounting seats 22. The free end of the peripheral portion 3 is fixed to the flange of the pump impeller shell 5 of the torque converter T.

A direct-coupling clutch indicated generally at a symbol D is constructed in a space formed between the front cover 1 and a turbine runner 4. The turbine runner 4 of the torque converter T is mounted fixedly on an output shaft 30 by means of the hub 41. The clutch disk 6 of the direct-coupling clutch D is mounted axially slidably on a center ring 42 fixed coaxially to the hub 41 at the front thereof. The clutch disk 6 is connected at the periphery thereof to a cushion plate 51 connected to the hub 41 through a spring 52. Accordingly, the clutch disk 6 is rotated together with the turbine runner 4 and when pressurized fluid is supplied into the torque converter T through the space between the turbine runner 4 and the pump impeller shell 5 and through the space between the front cover 1 and the clutch disk 6, then into the central bore 31 formed on the output shaft 30 and discharged from a drain port, not shown, as shown by an arrow A, the clutch disk 6 is pressed against the front cover 1.

Figure 5:
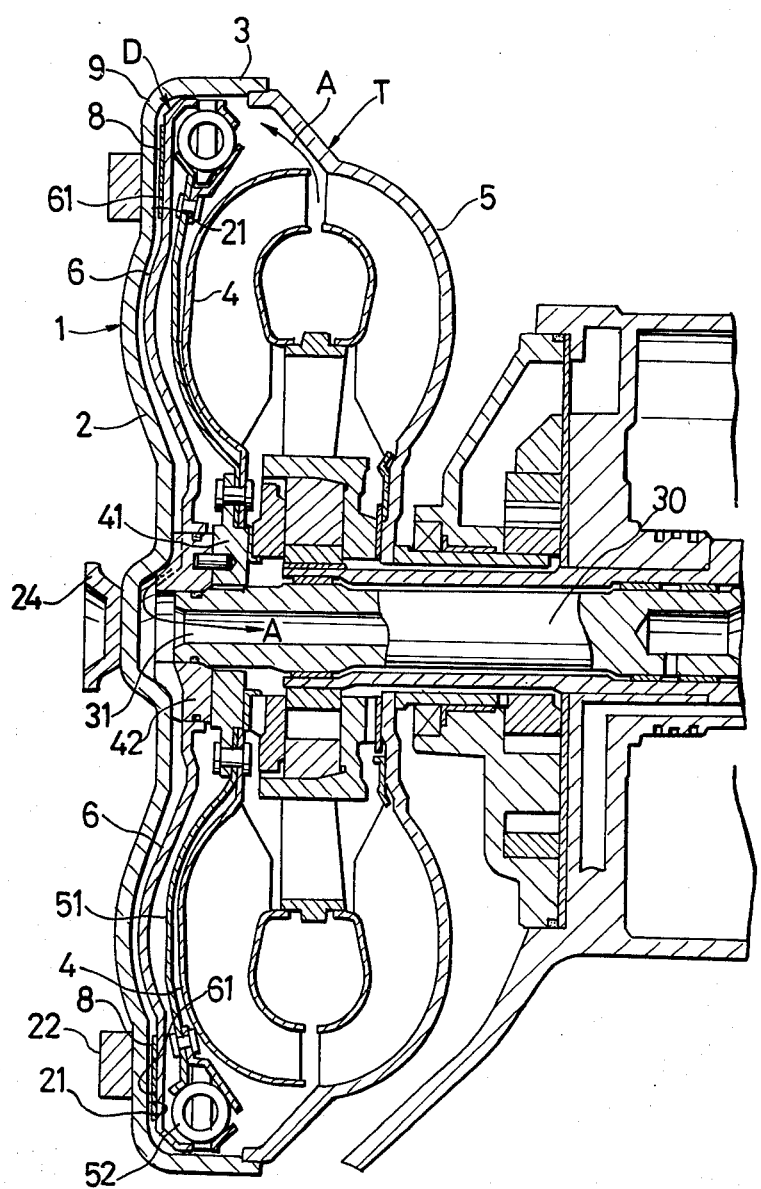
FIG. 5 is a sectional view of the fluid torque converter equipped with another embodiment of the direct-coupling clutch according to the present invention.

A flat annular surface 21 of a predetermined area is formed on the inside surface of the front wall portion 2 of the front cover 1 near the periphery of the front wall portion 2 in a plane perpendicular to the axis of the output shaft 30 of the torque converter T. The clutch disk 6 also has a flat annular surface 61 of a diameter the same with that of the flat annular surface 21 and of a predetermined area formed on the surface thereof opposite to the flat annular surface 21. A flat annular frictional material 8 of a high coefficient of friction is interposed between the surfaces 21 and 61. The frictional material functions as means to frictionally connect the front wall portion 2 of the front cover 1 and the clutch disk 6 when the clutch disk 6 is pressed toward the front cover 1. In the embodiment as shown in FIG. 1, the frictional material 8 is affixed to the surface 21 of the front wall portion 2 and the surface 61 of the clutch disk 6 engages frictionally with the frictional material 8, however, in a modification, the frictional material 8 may be affixed to the surface 61 of the clutch disk 6, while the surface 21 of the front wall portion 2 may be adapted to engage frictionally with the frictional material 8 as shown in FIG. 5. The surfaces 21 and 61 will be designated as "friction surfaces" hereinafter.

As shown in FIG. 2, the friction surface 61 (the second friction surface) of the clutch disk 6 is sloping with the portion at a greater radial position lying closer to the friction surface 21 (the first friction surface) formed on the front wall portion 2 of the front cover 1 than the portion at a smaller radial position so that the gap B between the friction surfaces 21 and 61 decreases radially outwardly.

The friction plate 8 is divided into two portions 81 and 82 along a circle of an intermediate radius between the outside radius and the inside radius of the friction plate 8. The first portion 81 affixed to the radially outer part of the first friction surface 21 is made of a first frictional material which has a high heat-radiating property and a large coefficient of dynamical friction, while the second portion 82 affixed to the radially inner part of the first friction surface 21 is made of a second frictional material which has a large coefficient of statical friction and a sufficient compressive strength durable to a large pressure to be applied to the surface. The frictional material is manufactured by impregnating a sheet-formed frictional material comprising a textile material (asbestos, cotton, synthetic fiber, glass fiber or the like), a filler (diatomaceous earth or the like) and a material for adjusting coefficient of friction (cashew resin, barite or the like) with a resin binder and then by hardening the resin binder. The coefficient of dynamical friction of the friction plate thus manufactured can be increased by properly determining the respective mixing ratios of those component materials, while the coefficient of statical friction can be increased by properly adding the material for adjusting coefficient of friction (cashew resin, barite or the like). The heat capacity (the heat resistance) can be increased by increasing the relative quantity of asbestos as well as by increasing the porosity of the plate (the hydraulic fluid permeate the spaces formed in the friction plate and absorbs the heat generated by the frictional slipping in the form of the heat of evaporation thus improving the heat resistance of the friction plate). The compressive strength can be increased by the increased rate of the resin binder, the increased quantity of the textile material and the decrease in the porosity.

When the working fluid of the torque converter T is supplied from the space between the turbine runner and the pump impeller as shown by an arrow A so as to flow through the space between the front cover 1 and the clutch disk 6 and through the central bore 31 formed in the output shaft 30 and then to be discharged from a drain port, not shown, under the control of a hydraulic control system, not shown, the clutch disk 6 is moved toward the front cover by the differential pressure between the hydraulic pressure applied to the clutch disk 6 from the turbine side and the hydraulic pressure also applied to the clutch disk 6 from the front cover side, so that the first and the second friction surfaces are engaged through the friction plate 8. At the beginning of engagement between the first and the second friction surfaces, first the outer peripheral portion 63 of the clutch disk 6 comes in contact with the first portion 81 of the friction plate 8 as shown in FIG. 3. In this stage, the torque transmission increases gradually while frictional heat is generated due to the relative sliding motion between the clutch disk 6 and the friction plate 8, since the respective revolving rates of the front cover 1 and the output shaft 30 are different with each other in this stage. The high coefficient of dynamical friction of the first portion 81 of the friction plate 8 allows the rapid increase of the transmission torque as well as the rapid synchronization of the revolving rate of the output shaft 30 with that of the front cover 1 so that the direct-coupling clutch is smoothly engaged. The reduced possibility of burning and the increased durability of the friction plate is assured, since the first portion 81 of the firction plate 8 is superior in heat resistance owing to its large heat capacity and its high heat radiating efficiency.

The clutch disk 6 is moved further toward the front cover 1 until finally it is brought into complete abutment with the front cover 1 and thus the direct-coupling clutch is completely engaged. After the completion of the engagement of the direct-coupling clutch, the central part of the clutch disk 6 is caused to protrude toward the front cover 1 by the pressure applied to the back surface of the clutch disk 6, as shown in FIG. 4, since the clutch disk 6 is thin, so that the clutch disk 6 is deformed and the second portion 82 of the friction plate 8 comes in contact with the inner peripheral portion 62 of the second friction surface, therefore, a large compressive pressure is applied to the second portion 82 of the friction plate 8. In this state, the high compressive strength and the high coefficient of statical friction of the second part 82 of the friction plate 8 provide a high durability and a large capacity of torque transmission.

In order to retain a narrow gap between the first and the second friction surfaces while the clutch is disengaged, outer peripheral portion of the first friction surface on the front cover 1 may be protruded toward the disk 6 instead of using the clutch disk shown in FIGS. 2, 3 and 4, and the friction plate may be affixed to the clutch disk 6 or may be slidably supported axially on the front cover. The friction engagement device of the present invention can be applied to other friction engagement devices, such as a brake, in addition to the direct-coupling clutch as described hereinbefore.

As has been hereinbefore, the friction engagement device of the present invention comprises a friction member having, in an appropriate combination, a first portion made of a frictional material having a large coefficient of dynamical friction as well as a large heat capacity or a high heat radiating efficiency and a second portion made of a frictional material having a large coefficient of statical friction and a high compressive strength, therefore, the friction engagement device of the present invention has a superior property of frictional engagement, increased durability and a large torque transmitting capacity.

It will thus be seen that the objects set forth above, among those made apparent from the preceeding description, are efficiently attained and, since certain changes may be made in the above constructions without departing from the spirit and the scope of the invention, it is intended that all matter contained in the above description or shown in the accompanying drawings shall be illustrative and not in a limiting sense.

It is also to be understood that the appended claims are intended to cover all of the generic and the specific features of the invention herein described and all statements of the scope of the invention which, as a matter of language, migh be said to fall therebetween.

What is claimed is:

1. A hydraulically-operated torque converter lock-up clutch comprising:

a front cover;

a thin clutch disc disposed so as to rotate about a shaft relatively to said front cover and to axially moved by the action of a fluid pressure;

a flat and annular first friction surface formed on said front cover in a plane perpendicular to the axis of said shaft;

a flat and annular second friction surface formed on said clutch disc opposite to said first friction surface and being disposed to gradually approach said first friction surface with the increase in diameter;

a friction plate disposed concentrically with respect to said shaft between said first and second friction surfaces and comprising a first portion extending over the radially outer portion of said friction plate and a second portion extending over the radially inner portion of said friction plate with respect to a circle of a predetermined radius, said first portion being made of a frictional material having a high coefficient of dynamical friction and a high heat capacity, while said second portion being made of a frictional material having a high coefficient of statical friction and a high compressive strength; and means to apply a fluid pressure to said clutch disc so as to urge said clutch disc toward said front cover whereby at the beginning of engagement between said first and second friction surface, said first portion of said friction plate comes into frictional engagement between said first and second friction surfaces and then said second portion of said friction plate comes into frictional engagement between said first and second friction surfaces through protrusion of said clutch disc at the central part thereof by the fluid pressure applied thereto.

2. A hydraulically-operated torque converter lock-up clutch according to claim 1, wherein said friction plate is affixed to said first friction surface.

3. A hydraulically-operated torque converter lock-up clutch according to claim 1, wherein said friction plate is affixed to said second friction surface.

* * * * *